US008010566B2

(12) United States Patent
Cho et al.

(10) Patent No.: US 8,010,566 B2
(45) Date of Patent: Aug. 30, 2011

(54) EXTENDED MULTIMEDIA FILE STRUCTURE AND MULTIMEDIA FILE PRODUCTING METHOD AND MULTIMEDIA FILE EXECUTING METHOD

(75) Inventors: Yong Ju Cho, Seoul (KR); Jae Gon Kim, Daejeon (KR); Jin Woo Hong, Daejeon (KR); Young Kwon Lim, Kyunggi-do (KR); Moon Sup Song, Seoul (KR); Hyoung Joong Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1079 days.

(21) Appl. No.: 11/576,485

(22) PCT Filed: Oct. 13, 2005

(86) PCT No.: PCT/KR2005/003416
§ 371 (c)(1),
(2), (4) Date: Apr. 2, 2007

(87) PCT Pub. No.: WO2006/041260
PCT Pub. Date: Apr. 20, 2006

(65) Prior Publication Data
US 2009/0024644 A1 Jan. 22, 2009

(30) Foreign Application Priority Data
Oct. 13, 2004 (KR) ........................ 10-2004-0081914

(51) Int. Cl.
*G06F 17/30* (2006.01)

(52) U.S. Cl. .................... 707/791; 707/793; 707/803
(58) Field of Classification Search ............. 707/913, 707/914, 915, 916, 791, 793, 803
See application file for complete search history.

(56) References Cited

U.S. PATENT DOCUMENTS

| 5,521,927 A | 5/1996 | Kim et al. |
| 5,677,927 A | 10/1997 | Fullerton et al. |
| 6,580,870 B1 | 6/2003 | Kanazawa et al. |
| 6,732,124 B1 * | 5/2004 | Koseki et al. ............. 707/999.1 |
| 6,988,144 B1 * | 1/2006 | Luken et al. ................. 709/231 |

(Continued)

FOREIGN PATENT DOCUMENTS

CN 1274506 A 11/2000

(Continued)

OTHER PUBLICATIONS

Cho, Y.J., et al., "Multimedia file format based on MPEG-21." 2003. *A collection of articles by The Korean Society of Broadcast Engineers*, vol. 8, Issue 4, pp. 392-398.

(Continued)

*Primary Examiner* — Rehana Perveen
*Assistant Examiner* — Thuy (Tiffany) Bui
(74) *Attorney, Agent, or Firm* — Ladas & Parry LLP

(57) ABSTRACT

Provided are an extended multimedia file structure, a multimedia file producing method, and a multimedia file executing method. The extended multimedia file structure includes: a metadata section including a media initial object descriptor (IOD) field and at least one track pointer; and a media data section including at least one media block indicated by the track pointer, wherein the at least one track pointer indicates a detail media resource contained in an embedded multimedia file or an external multimedia file.

16 Claims, 6 Drawing Sheets

U.S. PATENT DOCUMENTS

| | | | |
|---|---|---|---|
| 7,778,526 B2* | 8/2010 | Zacek | 386/111 |
| 2001/0044664 A1* | 11/2001 | Mueller et al. | 700/94 |
| 2002/0049832 A1 | 4/2002 | Ullman et al. | |
| 2002/0053078 A1* | 5/2002 | Holtz et al. | 725/14 |
| 2002/0136406 A1* | 9/2002 | Fitzhardinge et al. | 380/210 |
| 2004/0006575 A1* | 1/2004 | Visharam et al. | 707/104.1 |
| 2004/0057457 A1 | 3/2004 | Ahn et al. | |
| 2004/0098398 A1 | 5/2004 | Ahn et al. | |
| 2005/0076390 A1* | 4/2005 | Klausberger et al. | 725/134 |
| 2005/0137869 A1* | 6/2005 | Sihn et al. | 704/258 |
| 2007/0266252 A1* | 11/2007 | Davis et al. | 707/103 R |
| 2008/0049971 A1* | 2/2008 | Ramos et al. | 382/100 |

FOREIGN PATENT DOCUMENTS

| | | |
|---|---|---|
| CN | 1276127 A | 12/2000 |
| CN | 1291304 A | 4/2001 |
| CN | 101095348 A | 12/2007 |
| EP | 1294168 | 3/2003 |
| KR | 10-2003-0062138 | 7/2003 |
| WO | WO 03-028293 | 4/2003 |
| WO | WO 03-065731 | 8/2003 |
| WO | WO 03-098475 | 11/2003 |
| WO | WO 2004-077790 | 9/2004 |

OTHER PUBLICATIONS

Dave Raggert, et al; "HTML 4.01 Specification", W3C Recommendation Dec. 24, 1999, XP-002635658; 90 pages.

Fernando Pereira, et al; "The MPEG-4 Book" IMSC Press Multimedia Series, Andrew Tescher, Series Editor, pp. 1-17, ®2002 XP-002635676.

Apple Computer, et al; "QuickTime File Format", Mar. 1, 2001, XP-002588828, 274 pages.

* cited by examiner

[Figure 1]
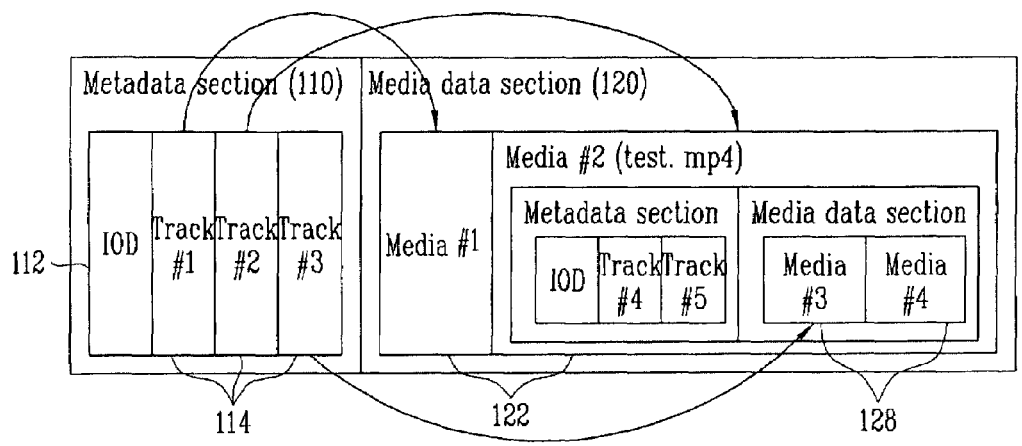
[Figure 2]
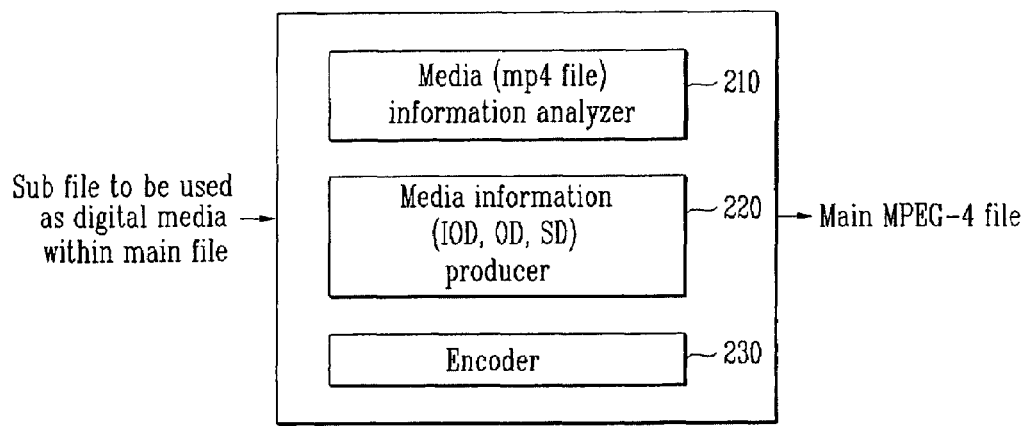

[Figure 3]
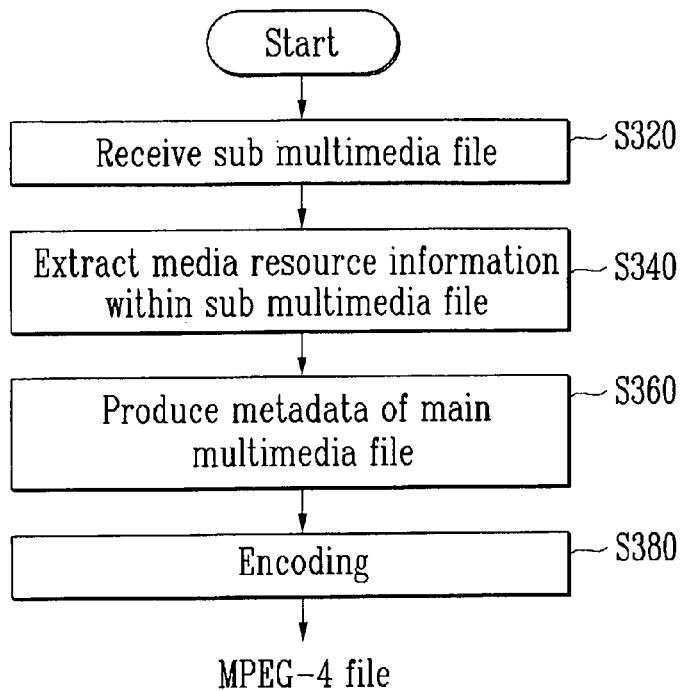
[Figure 4]
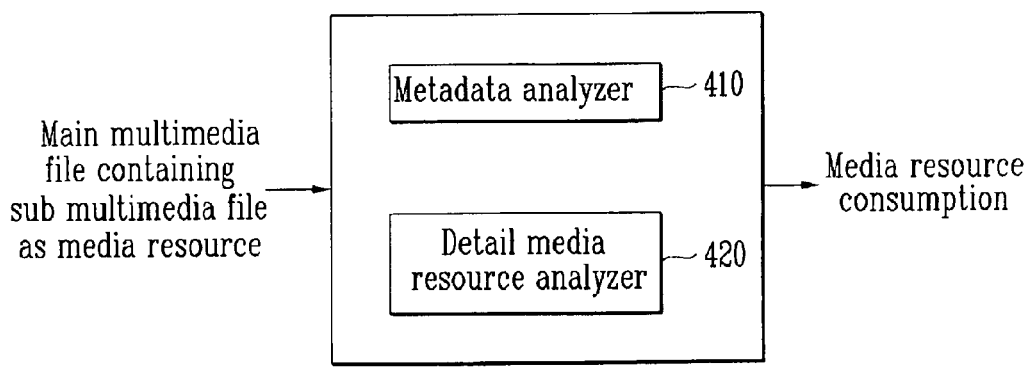

[Figure 5]
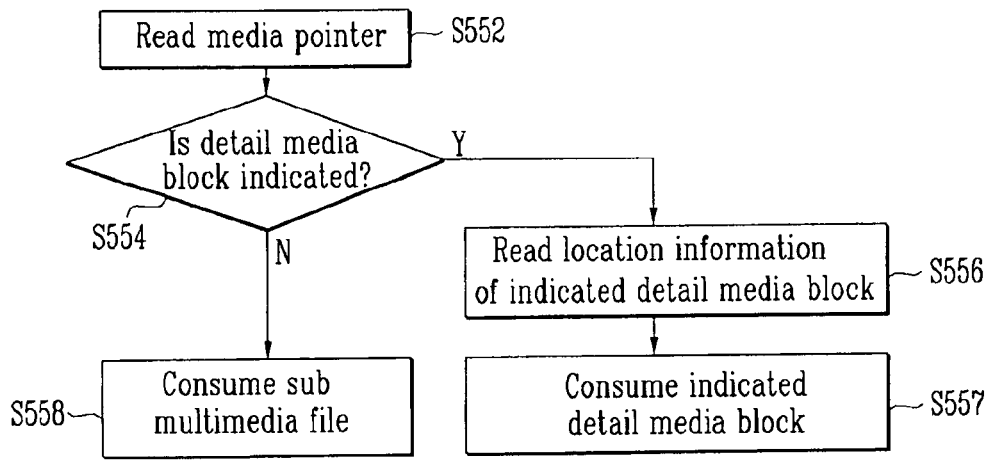
[Figure 6]
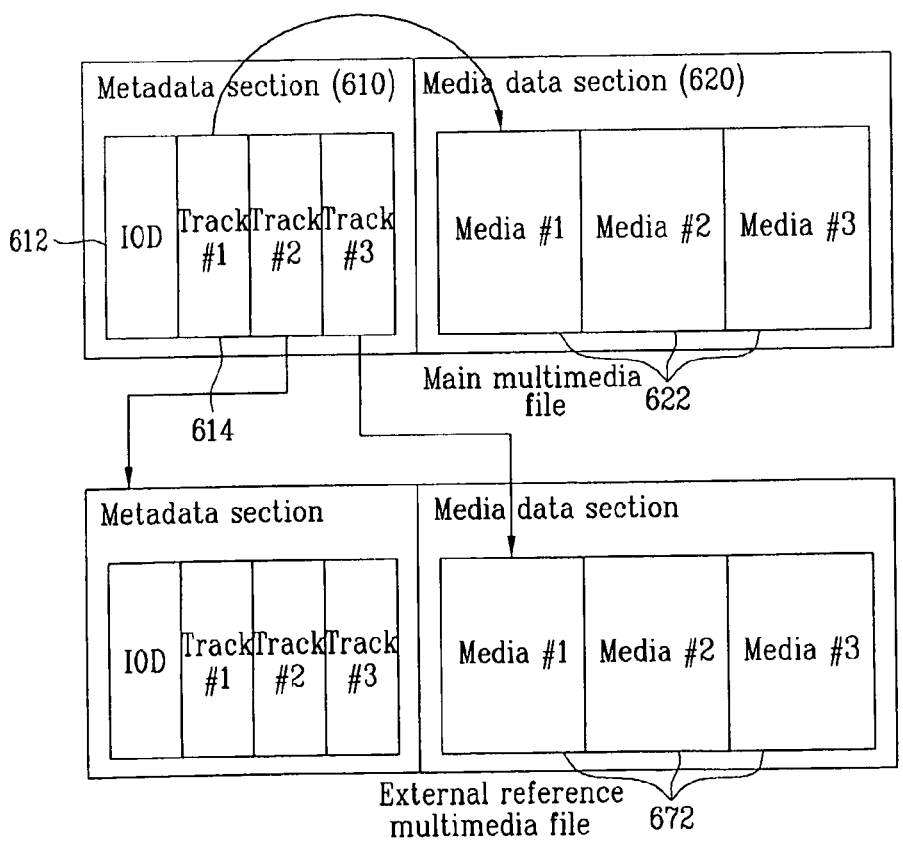

[Figure 7]
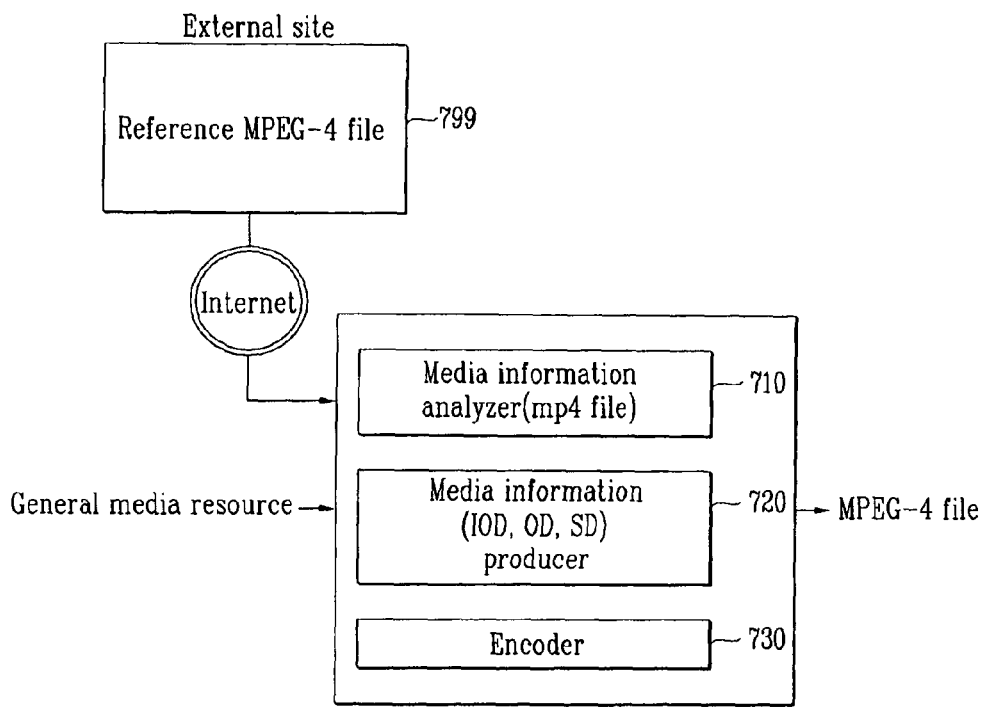
[Figure 8]
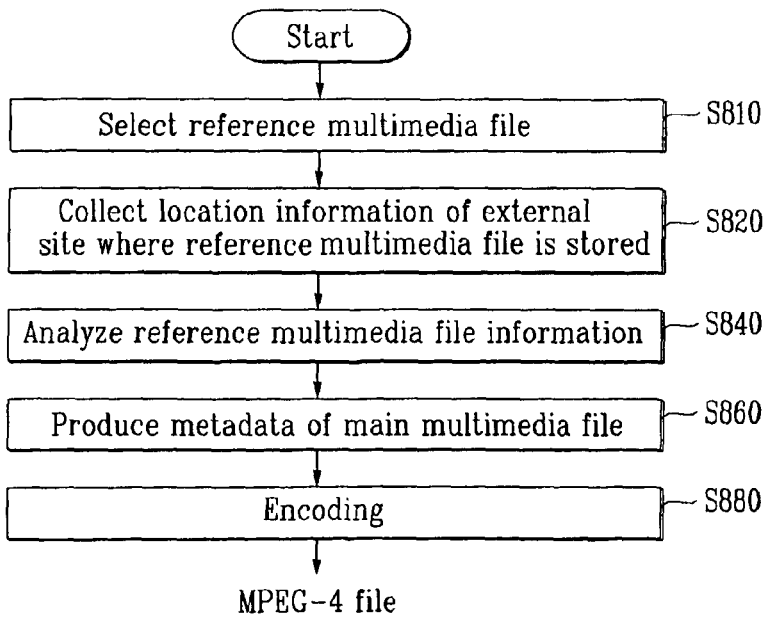

[Figure 9]
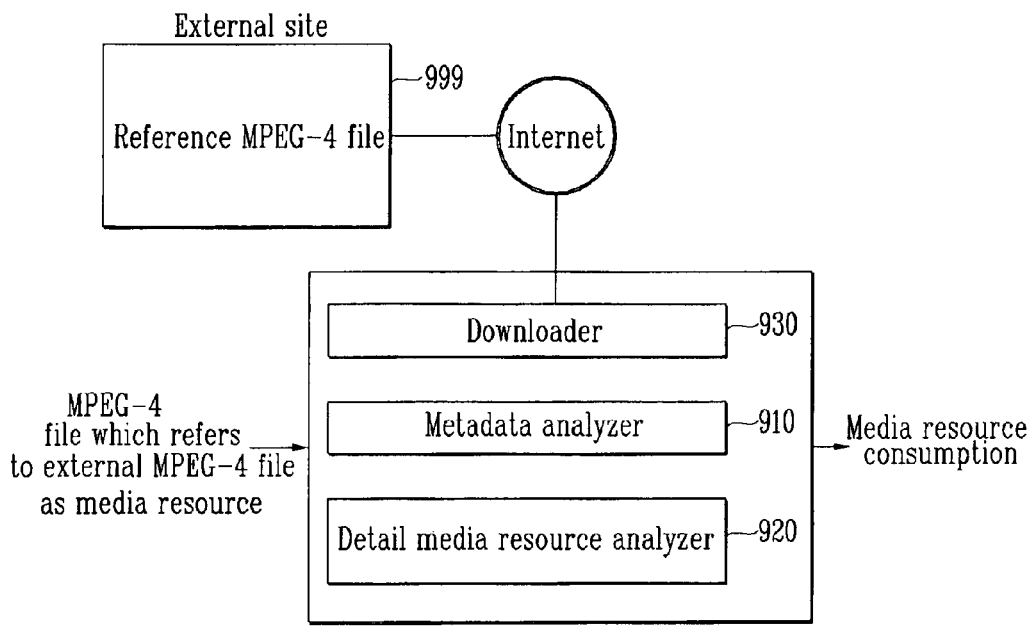
[Figure 10]
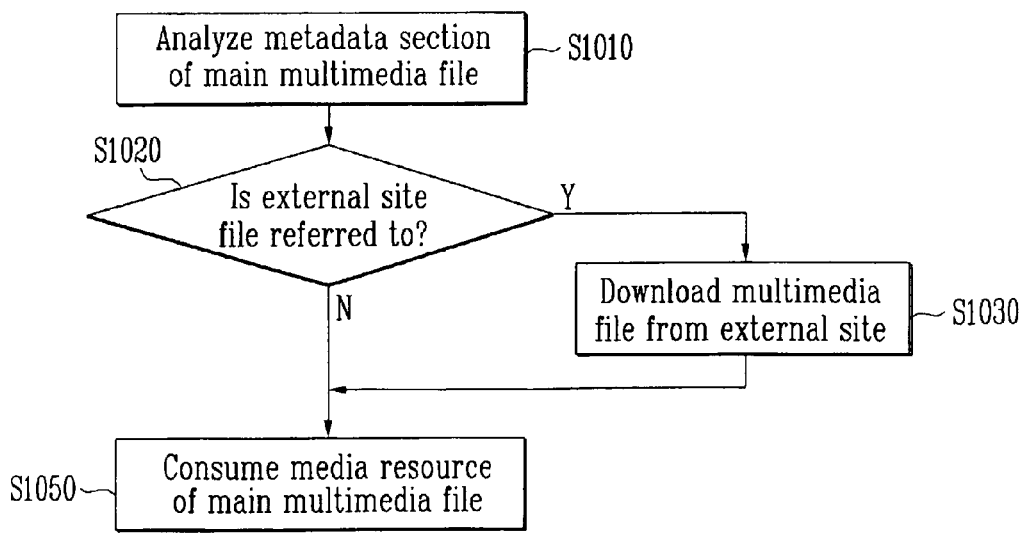

[Figure 11]
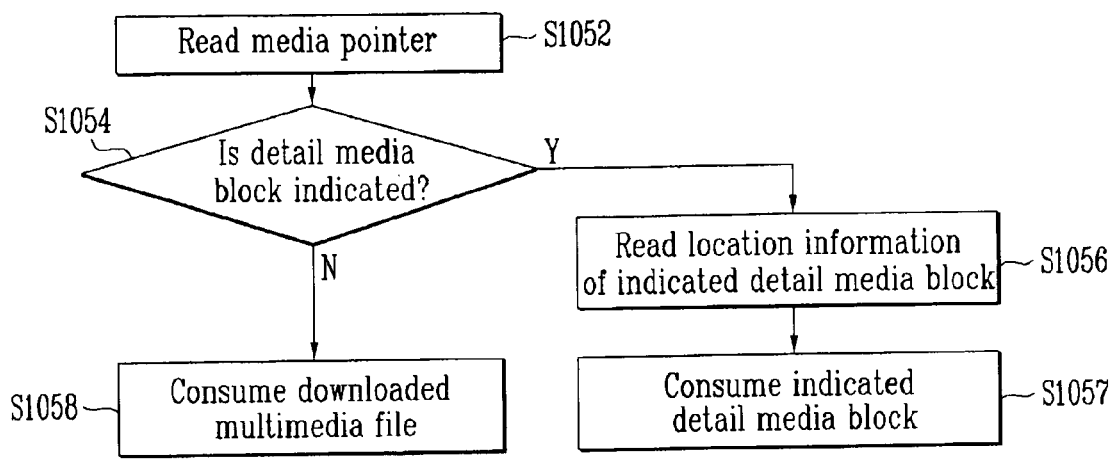

EXTENDED MULTIMEDIA FILE STRUCTURE AND MULTIMEDIA FILE PRODUCTING METHOD AND MULTIMEDIA FILE EXECUTING METHOD

TECHNICAL FIELD

The present invention relates to a multimedia file structure and a method and apparatus for accessing a media resource contained in a multimedia file, and more particularly, to a method and apparatus for accessing a detail media block contained in a sub multimedia file having the same file format.

BACKGROUND ART

MPEG format is a widely used multimedia file format thanks to its convenience and compatibility. MPEG-4 format, the most recently suggested version of the MPEG file format, contains almost all types of multimedia data as its internal media block.

However, even MPEG-4 format contains the other MPEG-4 file as its internal media block, and so it does not enable convenient access to a detail media resource (elementary stream (ES)) contained in another MPEG-4 file.

DISCLOSURE

[Technical Problem]

The present invention is directed to an extended multimedia file structure containing a multimedia file having the same format as its media resource.

The present invention is also directed to an extended multimedia file structure, in which a detail media resource can be specified to be accessed, when the multimedia file can embed or refer a multimedia file having the same format structure.

The present invention is also directed to a method for producing the extended multimedia file.

The present invention is also directed to a method for accessing and executing a media resource contained in a sub multimedia file of the extended multimedia file.

The present invention is also directed to a method for addressing a media resource in an International Standardization Organization (ISO) media file format to provide compatibility with an MPEG-4 file.

[Technical Solution]

One aspect of the present invention provides an extended multimedia file structure from a multimedia file structure, comprising: a metadata section including a media object descriptor field and at least one track pointer; and a media data section including at least one media block indicated by the track pointer, wherein the at least one track pointer indicates a detail media resource contained in an embedded multimedia file and an external multimedia file.

Another aspect of the present invention provides a computer readable recording medium having an extended multimedia file structure from a multimedia file structure comprising: a metadata section including a media object descriptor field and at least one track pointer; and a media data section including at least one media block indicated by the track pointer, wherein the at least one track pointer indicates a detail media resource contained in an embedded multimedia file or an external multimedia file.

Yet another aspect of the present invention provides a multimedia file producing method, comprising the steps of: reading a sub multimedia file to be used as an embedded media resource; extracting and analyzing information of the sub multimedia file; producing metadata which contains a pointer which indicates a location of a detail media block contained in the sub multimedia file; and collecting the metadata, a necessary media block, and the multimedia file to produce a main multimedia file.

Still another aspect of the present invention provides a multimedia file producing method, comprising the steps of: selecting a reference multimedia file(grasping the location); extracting and analyzing information of the reference multimedia file; accessing the external site to analyze the information of the reference multimedia file; producing metadata which contains a pointer for indicating a location of the reference multimedia file and/or a pointer for indicating a location of a detail media block contained in the reference multimedia file; and collecting the metadata, a necessary media block, and the location information of the reference multimedia file to produce a main multimedia file.

Still another aspect of the present invention provides a multimedia file executing method, comprising the steps of: receiving a multimedia file; extracting and analyzing metadata of the multimedia file; and reading in order media blocks at a location indicated by a media pointer which forms the metadata, wherein when the media pointer indicates a detail media block of a sub multimedia file during the step of reading media blocks, the indicated detail media block is read.

Still another aspect of the present invention provides a multimedia file executing method, comprising the steps of: receiving a multimedia file; extracting and analyzing metadata of the multimedia file; and reading in order media blocks at a location indicated by the media pointer which forms the metadata, wherein when the media pointer indicates an external multimedia file during the step of reading media blocks, the indicated external multimedia file of indicated position is read.

In the multimedia file producing/executing methods, standard location information of the media resource may be produced using an offset value of the media data section in which the media resource is stored.

In the multimedia file producing/executing methods, location information of the media resource in the MPEG-4 file may be a track value in the metadata section of the MPEG-4 file.

In the multimedia file producing/executing methods, location information of the media resource in the MPEG-4 file may be an ODID value and/or an ESID value.

ADVANTAGEOUS EFFECTS

As described above, according to the present invention, the media resource can be efficiently accessed and reproduced by standardizing the location information of the detail media resource of the embedded sub multimedia file in the multi media file (MPEG-4 file) format.

Further, according to the present invention, the media resource can be efficiently accessed and reproduced by standardizing the location information of the detail media resource of the reference multimedia file stored in the external site in the multi media file (MPEG-4 file) format.

DESCRIPTION OF DRAWINGS

FIG. 1 is a block diagram conceptually illustrating an MPEG-4 file format according to an exemplary embodiment of the present invention;

FIG. 2 is a block diagram illustrating an MPEG-4 file producing apparatus according to an exemplary embodiment of the present invention;

FIG. 3 is a flowchart illustrating an MPEG-4 file producing method which is performed by the MPEG-4 file producing apparatus of FIG. 2;

FIG. 4 is a block diagram illustrating an MPEG-4 file executing apparatus according to an exemplary embodiment of the present invention;

FIG. 5 is a flowchart illustrating an MPEG-4 file executing method according to an exemplary embodiment of the present invention;

FIG. 6 is a block diagram conceptually illustrating an MPEG-4 file format according to another exemplary embodiment of the present invention;

FIG. 7 is a block diagram illustrating an MPEG-4 file producing apparatus according to another exemplary embodiment of the present invention;

FIG. 8 is a flowchart illustrating an MPEG-4 file producing method which is performed by the MPEG-4 file producing apparatus of FIG. 7;

FIG. 9 is a block diagram illustrating an MPEG-4 file executing apparatus according to another exemplary embodiment of the present invention; and FIGS. 10 and 11 are flowcharts illustrating an MPEG-4 file executing method according to another exemplary embodiment of the present invention.

* Description of Major Symbol in the above Figures

| 110, 610: | Metadata section | 120, 620: | Media data section |
|---|---|---|---|
| 210, 710: | Media information analyzer | 220, 720: | Media information producer |
| 230, 730: | (File) Encoder | 310, 830: | Metadata analyzer |
| 320, 820: | Detail media resource analyzer | 830: | Downloader |
| 799, 899: | External Site | | |

MODE FOR INVENTION

Hereinafter, exemplary embodiments of the present invention will be described in detail. However, the present invention is not limited to the exemplary embodiments disclosed below, but can be implemented in various types. Therefore, the present exemplary embodiments are provided for complete disclosure of the present invention and to fully inform the scope of the present invention to those ordinarily skilled in the art.

A "pointer" described in the following exemplary embodiments of the present invention refers to a means for identifying a multimedia file or a media block within a corresponding multimedia file and having them searched. The "pointer" refers both to an index for indicating corresponding contents together with other related supplemental information and a serial number in a corresponding media group, as well as to a pointer that merely indicates an address location in a memory where corresponding contents is recorded.

The present invention can be applied to all types of multimedia file formats that include a metadata section and a media data section, but exemplary embodiments of the present invention will be explained focusing on the MPEG-4 file format.

Exemplary embodiments of the present invention will be explained using a conventional MPEG-4 file as a multimedia file embedded in or referred to by a main MPEG-4 file, but an extended MPEG-4 file as the present invention can be used as a multimedia file embedded in or referred to by the main MPEG-4 file. The latter case has a complicated structure in which another multimedia file is referred to while a sub/reference multimedia file is executed.

In the exemplary embodiments of the present invention, a multimedia file embedded in a main multimedia file is called an "embedded multimedia file", and a multimedia file referred to by the main multimedia file is called a "reference multimedia file".

The main multimedia file comprises a metadata section which contains track pointers for sub/reference multimedia files and media blocks indicated by the track pointers (referred to as simply media pointers or tracks). A media block contained in the sub multimedia file or the reference multimedia file is called a "detail media block (resource)".

EMBODIMENT 1

FIG. 1 is a block diagram conceptually illustrating an MPEG-4 file format according to an exemplary embodiment of the present invention. The MPEG-4 file of the present invention comprises a metadata section 110 and a media data section 120. The metadata section 110 comprises a media object descriptor field 112 and a plurality of track pointers 114. The media data section 120 comprises a plurality of media blocks 122 respectively indicated by each of track pointers 114. A multimedia file of the same structure is embedded in at least one of the media blocks 122. At least one of the track pointers is a pointer for indicating a detail media block 128 of the embedded multimedia file.

The metadata section 110 of the MPEG-4 file format comprises a movie header, an initial object descriptor (IOD), and tracks. In each track, information (e.g., time-timing, location, etc.) about each media resource contain in the MPEG-4 file is defined in functional units of atoms, and it serves as a pointer for each media resource. The media data section 120 contains various media resources such as an audio file, a video file, a JPEG file, etc. In particular, the media data section 120 may contain another MPEG-4 file as one media resource.

A structure and function of the metadata section of the MPEG-4 file are specified in detail in the MPEG-4 Systems standard (ISO/IEC 14496-1). The metadata section 110 of the MPEG-4 file can be expressed as a group of track pointers, and each track contains information such as a location of a media resource. Thus, it is possible to access a media block in which a media resource in the media data section 120 is recorded, by using the track information.

The media data section 120 of the main MPEG-4 file according to the present invention contains a discrete sub MPEG-4 file as its media resource, and the sub MPEG-4 file has a general MPEG-4 file format and so contains a detail media resource therein as well. Part of the tack pointers 114 are for the embedded sub MPEG-4 files, and another part of the track pointers are for the detail media resources 128 contained in the sub MPEG-4 file (i.e., indicating detail media blocks contained in the sub MPEG-4 file).

The track pointer that indicates the sub MPEG-4 file itself indicates the sub MPEG-4 file as one of the media resources and so is no different from a track pointer that indicates a general media resource. The track pointer that indicates the detail media resource in the sub MPEG-4 can be implemented by two methods. The first method using the pointer in the narrow sense is to express the track pointer by using a location value in a memory at which a corresponding media block starts. Here, the track pointer can be expressed by an address value in the memory, but it is more preferable to express the track pointer by an address distance (i.e., offset value) from a reference point such as a starting address of the main MPEG-4 file. The second method is to express the tack pointer by using a location of the sub MPEG-4 file and an identification value within the sub MPEG-4 file (e.g., track within the sub MPEG-4 file). The second method does not enable easy access to the detail media resource required by a device for executing the main MPEG-4 file, but it is only a little different from the conventional art and so enables easy improvement of conventional devices.

FIG. 2 is a block diagram illustrating an MPEG-4 file producing apparatus according to an exemplary embodiment of the present invention.

Referring to FIG. 2, the MPEG-4 file producing apparatus comprises a media information analyzer 210, a media information producer 220, and a encoder 230. The media information analyzer 210 analyzes an input media resource, i.e., an MPEG-4 file, estimates the media resource contained in this file, and transmits media resource information to the media information producer 220.

The media information producer 220 produces basic information (IOD, OD, SD) necessary to produce the final MPEG-4 file based on the media resource information. The encoder 230 files the metadata section 110 and the media data section 120 using the basic information to thereby produce one MPEG-4 file.

FIG. 3 is a flowchart illustrating an MPEG-4 file producing method which is performed by the MPEG-4 file producing apparatus of FIG. 2.

The MPEG-4 file producing method according to an exemplary embodiment of the present invention comprises a step (S320) for reading a sub MPEG-4 file as an embedded media resource, a step (S340) for extracting and analyzing the media resource information (metadata) within the sub MPEG-4 file, a step (S360) for producing the metadata which contains a pointer for indicating a location of the sub MPEG-4 file and/or a pointer for indicating a location of a detail media block in which the sub multimedia file is contained, and a step (S380) for collecting the produced metadata, necessary media block and the sub MPEG-4 file to produce a main MPEG-4 file.

In more detail, when the MPEG-4 file is input as the media resource (S320), the media information analyzer 210 analyzes the MPEG-4 file to extract the media resource information (S340). Then, the media information producer 220 produces essential basic information and the media resource information (S360). The produced essential basic information is used as the metadata (media resource information) of the main MPEG-4 file finally produced by the encoder 230 (S380).

For example, in producing a main file "final.mp4", when a sub MPEG-4 file "test.mp4" is contained as a media resource of the "final.mp4" file, the media information analyzer 210 analyzes the "test.mp4" file to extract the media resource information contained in the "test.mp4" file and transmits the media resource information to the media information producer 220 (S340). Then, the media information producer 220 produces the essential basic information based on the media resource information within the "test.mp4" file (information on which media resource (ES) is defined in which track) and the media resource information to be contained in the "final.mp4" file (S360). Then, the file composing process (S380) is performed to thereby form one MPEG-4 file which contains the metadata section 110 and the media data section 120 as shown in FIG. 1.

A structure of various metadata elements which are produced when the MPEG-4 file is produced according to an exemplary embodiment of the present invention will be explained below in detail.

According to an exemplary embodiment of the present invention, when the media resource is a video file, an audio file, a JPEG file, etc., like the conventional art, the essential basic information (IOD, OD, etc.) can be produced by using simply a file name. The following expresses a structure of the essential basic information when the media file is a JPEG file.

```
ObjectDescriptorID 13
    esDescr {
        ES_ID 113
        muxInfo
        {
            fileName Menu.jpg
            streamFormat JPEG
        }
        decConfigDescr {
            stream Type 4         // VisualStream
            objectTypeIndication 0x6C // JPEG
            bufferSizeDB 20000
            decSpecificInfo DecoderSpecificInfoString {
                info "obsolete string"
            }
        }
        slConfigDescr {
            useAccessUnitStartFlag TRUE
            useAccessUnitEndFlag TRUE
            useRandomAccessPointFlag TRUE
            useTimeStampsFlag TRUE
            timeStampResolution 1
            timeStampLength 10
            packetSeqNumLength 3
            AU_seqNumLength 8
        }
}
```

In the case of addressing a particular media resource (ES) within the "test.mp4" file which is physically embedded in the main MPEG-4 file, the essential basic information can be produced as standard information by combination with track information within the metadata (moov) or an object descriptor ID (ODID) value and an elementary stream ID (ESID) value by using the name of the embedded file and the media resource information of the "test.mp4" file, as below. That is, when the ODID value is "0x10" and the ESID value is "0x11" the media resource within the "test.mp4" file can be addressed by using the ODID value and the ESID value of the MPEG-4 file as below. The addressing can be performed by using either the ODID value or the ESID value as well.

```
"test.mp4#moov/trak[1]"
or,
"test.mp4#trak[1]"
or,
"test.mp4#ODID=0x10&ESID=0x11"
```

The media resource information represents digital media indicated by a first track of the metadata section 130 of the MPEG-4 file, and the MPEG-4 file can be accessed or reproduced by using the media resource information. Additionally, the essential basic information can be simplified by defining the track value without using the metadata (moov).

FIG. 4 is a block diagram of an MPEG-4 file executing apparatus according to an exemplary embodiment of the present invention.

Referring to FIG. 4, the media resource addressing apparatus comprises a metadata analyzer 410 and a detail media resource analyzer 420. The metadata analyzer 410 analyzes the metadata section of the input MPEG-4 file to extract location information of a sub MPEG-4 file contained as the media resource and transmits the location information to the detail media resource analyzer 420. The detail media resource analyzer 420 analyzes the metadata section of the sub MPEG-4 file contained as the media resource to extract a location of the detail media resource (ES).

An MPEG-4 file executing method performed by the MPEG-4 file executing apparatus of FIG. 4 will be explained below. FIG. 5 is a flowchart illustrating the MPEG-4 file executing method according to an exemplary embodiment of the present invention.

The MPEG-4 file executing method according to an exemplary embodiment of the present invention comprises a step for extracting and analyzing metadata of the MPEG-4 file, and a step for reading in order and consuming media blocks at a location indicated by a media pointer which forms the metadata. During the step for consuming the media blocks, a general media block, the whole sub MPEG-4 file, or a prescribed detail media block of the sub MPEG-4 file can be consumed.

The procedure for consuming the general media block is performed in a similar method to the conventional art and thus its description is omitted. Focusing on the procedure using the media pointer which indicates the sub MPEG-4 file, as shown in FIG. 5, the MPEG-4 file executing method comprises a step (S552) for reading a corresponding media pointer related to the sub MPEG-4 file, a step (S554) for estimating whether the whole sub MPEG-4 file is executed or a prescribed detail media block is executed through the corresponding media pointer information of the main MPEG-4 file, a step (S558) for consuming the sub MPEG-4 file by a similar method as the procedure for consuming a general MPEG-4 file when the embedded file itself is executed, a step (S556) for reading the location information of the detail media block indicated by the media pointer of the main MPEG-4 file when it is estimated in step S554 that only the prescribed detail media block is executed, and a step (S557) for consuming the indicated detail media block.

Referring to FIGS. 4, when an MPEG-4 file (main file) containing an MPEG-4 file (sub file) as a media resource is input in the step for analyzing the metadata of the main file, the metadata analyzer 410 analyzes the metadata section (item location box or data information box) within the main MPEG-4 file to extract the location information of the sub MPEG-4 file referred to as the media resource. That is, in consuming (reproducing) the input main file (e.g., final.mp4), when the sub MPEG-4 file "test.mp4" is contained as the media resource of the "final.mp4" file, the metadata analyzer 410 analyzes the metadata section (item location box) of the "final.mp4" file to extract a location of the "test.mp4" file and the detail media resource information (information about which media resource (ES) is defined in which track).

In steps S552 to S558, the detail media resource analyzer 420 accesses the detail location of the detail media resource contained in the "test.mp4" file by using the track ID (track_ID) to obtain the desired detail media resource. Then, the corresponding media resource is consumed by using the information.

Meanwhile, in the case of addressing the detail media resource (ES) within the "test.mp4" file contained as the media resource, the essential basic information can be expressed by combination with a track value within the metadata (moov) by using the file name and information of the "test.mp4" file as below:

"test.mp4#moov/track[1]"
or
"test.mp4#/track[1]"

Alternatively, the essential basic information can be expressed by defining the track value without using the metadata (moov).

EMBODIMENT 2

FIG. 6 is a block diagram conceptually illustrating an MPEG-4 file format according to another exemplary embodiment of the present invention. The MPEG-4 file of the present embodiment comprises a metadata section 610 and a media data section 620. The metadata section 610 comprises a media object descriptor field 612 and a plurality of track pointers 614. The media data section 620 comprises a plurality of media blocks 622 respectively indicated by a plurality of track pointers 614. At least one of the track pointers 614 is a pointer for indicating a detail media resource 672 of an external reference MPEG-4 file.

The media data section 620 contains various media resources such as an audio file, a video file, a JPEG file, etc. In particular, an external reference MPEG-4 file can be referred as a media resource.

The reference MPEG-4 file referred to by the main MPEG-4 file is a general MPEG-4 file and so contains a media resource (detail media resource). Part of the tack pointers 614 of the main file are for the external reference MPEG-4 file (i.e., indicating whole reference MPEG-4 file), and another part of the track pointers 614 are for the detail media resource 672 contained in the reference MPEG-4 file (i.e., indicating detail media blocks contained in the reference MPEG-4 file).

The track pointer that indicates the reference MPEG-4 file indicates the sub MPEG-4 file as one of the media resources and is different from a track pointer which indicates a general media resource because it may indicate a remote file, so the track pointer can contain a URL. The location of the reference MPEG-4 file can be expressed by the following three cases. The reference MPEG-4 file can be stored in the same storage (e.g., same folder or same directory) of the same device as the main MPEG-4 file according to the first case, in the same device as the main MPEG-4 file according to the second case, or in an external device that is accessible through a network according to the third case.

In order to specify the reference MPEG-4, the first case requires a file name, the second case requires a file name and a storage name (e.g., folder or directory), and the third case requires a file name and a URL. Since the storage name can be indicated by a URL and in the first case a URL can be substituted to NULL, it is preferable to use a file name and a URL as a method for specifying the reference MPEG-4 file. That is, in the case of referring to another MPEG-4 file outside the main file as the media resource, essential basic information (IOD, OD, etc.) for addressing the media resource can be produced by a combination with a URL value as below:

```
"http://www.etri.re.kr/test.mp4#moov/track[1]"
or
"http://www.etri.re.kr/test.mp4# track[1]"
or
"http://www.etri.re.kr/test.mp4#odid=0x10&esid=0x11"
```

FIG. 7 is a block diagram illustrating an MPEG-4 file producing apparatus according to another exemplary embodiment of the present invention.

Referring to FIG. 7, the MPEG-4 file producing apparatus comprises a media information analyzer 710, a media information producer 720, and an encoder 730. The media information analyzer 710 analyzes the reference MPEG-4 file having its external location indication, estimates the media resource contained in this file, and transmits media resource information to the media information producer 720.

The media information producer 720 produces basic information (IOD, OD, SD) necessary to produce the final MPEG-4 file based on the media resource information. The encoder 730 encodes the metadata section 610 and the media data section 620 using the basic information and the location information of the reference file to thereby produce one MPEG-4 file.

FIG. 8 is a flowchart illustrating an MPEG-4 file producing method which is performed by the MPEG-4 file producing apparatus of FIG. 7.

The MPEG-4 file producing method according to another exemplary embodiment of the present invention comprises a step (S810) for selecting a reference MPEG-4 file at an external site 799 as the media resource to be referred to, a step (S820) for collecting location information of the external site 799 which stores the selected reference MPEG-4 file, a step (S830) for accessing the external site 799 to extract and analyze information of the reference MPEG-4 file, a step (S860) for producing the metadata which contains a pointer for indicating a location of the reference MPEG-4 file and/or a pointer for indicating a location of a detail media block contained in the reference MPEG-4 file, and a step (S880) for collecting the produced metadata, necessary media block, and location information of the multimedia file to produce a main multimedia file.

In more detail, when the external reference MPEG-4 file is selected as the media resource which will be contained in the main file (S810), the media information analyzer 610 accesses the external MPEG-4 file to extract necessary media resource information (S820). Before the step (S820) for extracting the media resource information, a step for loading the external MPEG-4 file can be added. Then, the media information producer 620 produces essential basic information and the media resource information (S860). The produced essential basic information is used as the metadata (media resource information) of the main MPEG-4 file finally produced by the encoder 730 (S880).

For example, in producing a main file "final.mp4" when an external reference MPEG-4 file "test.mp4" is referred to as a media resource of the "final.mp4" file, the media information analyzer 610 accesses a corresponding external site 799 and reads and analyzes the "test.mp4" file to thereby extract the media resource information contained in the "test.mp4" file, and transmits the media resource information to the media information producer 620 (S840). Then, the media information producer 620 produces the essential basic information based on the media resource information within the "test.mp4" file (information as to which media resource (i.e., ES) is defined in which track) and the media resource information which is to be contained in the "final.mp4" file (S860).

Then, the encoding process (S880) is performed to thereby form one MPEG-4 file which contains the metadata section 610 and the media data section 620 as shown in FIG. 6.

In this embodiment, in the case where a media resource outside the main file is referred to, the essential basic information (within item location box or data information box) for addressing the media resource can be expressed by combination with a URL as below:

```
"http://www.etri.re.kr/test.mp4#moov/track[1]"
or
"http://www.etri.re.kr/test.mp4# track[1]"
```

Meanwhile, the MPEG-4 file producing apparatus which produces the main MPEG-4 file can store the reference MPEG-4 file referred to by the main MPEG-4 file. In this case, the MPEG-4 file producing apparatus can make its own URL information contained in the metadata of the main MPEG-4 file.

FIG. 9 is a block diagram illustrating an MPEG-4 file executing apparatus according to another exemplary embodiment of the present invention.

Referring to FIG. 9, the media resource addressing apparatus comprises a metadata analyzer 910, a detail media resource analyzer 920 and a downloader 930. The metadata analyzer 910 analyzes the metadata section of the input MPEG-4 file to extract location information of an external site 999 which stores a reference MPEG-4 file referred to as the media resource and transmits the location information to the downloader 930. The downloader 930 accesses the external site 999 by using the location information to download a corresponding reference MPEG-4 file and stores the reference MPEG-4 file in its internal memory. The detail media resource analyzer 920 analyzes the metadata section of the downloaded reference MPEG-4 file to extract a location of the detail media resource (ES).

An MPEG-4 file executing method performed by the MPEG-4 file executing apparatus of FIG. 9 will be explained below. FIGS. 10 and 11 are flowcharts illustrating the MPEG-4 file executing method according to another exemplary embodiment of the present invention.

The MPEG-4 file executing method according to another exemplary embodiment of the present invention, as shown in FIG. 10, comprises a step (S1010) for analyzing metadata of the media file to be executed (an external multimedia file is referred as the media resource), and a step (S1020) for checking whether each media pointer which forms the metadata refers to a file of the external site or not, and a step (S1050) for consuming the media blocks at a location indicated by the media pointer in order. When it is estimated in step S1020 that the media pointer indicates the external multimedia file, a step (S1030) for downloading the reference multimedia file of the indicated location is performed.

Distinguish processes perform the media pointer indicating the reference file from the MPEG-4 file executing method. Focusing on the procedure for consuming the detail media block of the reference multimedia file, the MPEG-4 file executing method, as shown in FIG. 11, comprises a step (S1052) for reading a corresponding media pointer (contained in the metadata) related to consumption of the reference multimedia file, a step (S1054) for estimating whether the multimedia pointer specifies the detail media block of the reference multimedia file or not, a step (S1056) for reading the location information of the reference media block specified by the media pointer, and a step (S1057) for consuming the media resource of the specified detail media block.

Referring to FIG. 9, when a main MPEG-4 file (main file) that refers to an external reference MPEG-4 file (reference file) as the media resource is input, the metadata analyzer 910 analyzes the metadata section (item location box or data information box) within the main MPEG-4 file (S1010) to extract the location information of the reference MPEG-4 file referred to as the media resource. Then, the downloader 930 downloads the reference MPEG-4 file from the corresponding external site 999 using the location information (S1030), and the detail media resource analyzer 920 accesses the detail media block of the downloaded reference MPEG-4 file (S1052 to S1058).

Since the metadata section analyzing step S1010 includes the procedure for obtaining the external storage location information of the reference MPEG-4 file, the external multimedia file downloading step S1030 can include the step for accessing the external site using the location information and the step for downloading the reference multimedia file.

That is, in reproducing (i.e. consuming) the input main file (e.g., final.mp4), when the external MPEG-4 file "test.mp4" is referred to as the media resource of the "final.mp4" file, the metadata analyzer 910 analyzes the metadata section (item location box) of the "final.mp4" file to find out a remote storage location of the "test.mp4" file expressed by the URL (S1010). The downloader 930 accesses the corresponding external storage location to download the "test.mp" file (S1030).

Then, the detail media resource analyzer 920 accesses the location of the detail media resource contained in the downloaded "test.mp4" file by using the track ID (track_ID) (S1056) to obtain the desired detail media resource. Then, the corresponding media resource is consumed. (S1057).

As described above, when a media resource outside the main file is referred to, the essential basic information (within item location box or data information box) for addressing the media resource can be expressed by combination with the URI value as below:

---

"http://www.etri.re.kr/test.mp4#moov/track[1]"
or
"http://www.etri.re.kr/test.mp4# track[1]"

---

While the present invention has been described with reference to exemplary embodiments thereof, it will be clear to those of ordinary skill in the art that various other modifications are possible within the scope and spirit of the present invention as defined by the appended claims.

The above and other features and advantages of the present invention will become more apparent to those of ordinary skill in the art by describing in detail exemplary embodiments thereof with reference to the attached drawings in which:

The invention claimed is:

1. A non-transitory computer readable medium having stored thereon an extended multimedia file structure from a multimedia file structure, comprising:
   a metadata section including a media object descriptor field and at least one track pointer; and
   a media data section including at least one media block indicated by the track pointer,
   wherein the at least one track pointer indicates a detail media resource contained in an embedded the multimedia file or external the multimedia file,
   wherein the pointer that indicates the detail media block of the sub multimedia file contains an indicator for the sub multimedia file and an indicator for the detail media block in the sub multimedia file, and
   wherein at least one media block contains a sub multimedia file having the same format as the multimedia file structure, and the at least one track pointer is the pointer which indicates the detail media block of the sub multimedia file;
   wherein the multimedia file structure is an MPEG-4 file structure, and the indicator for the detail media block is a track number which represents the detail media block within the sub multimedia file; and
   wherein the at least one track pointer is the pointer which indicates a detail media block of a reference multimedia file, having the same file format as the multimedia file structure, which is located at an external site accessible through a network.

2. The non-transitory computer readable medium having stored thereon the extended multimedia file structure of claim 1, wherein the pointer that indicates the detail media block of the sub multimedia file is an offset value for an address of a location where the detail media block is stored within the media data section.

3. The non-transitory computer readable medium having stored thereon the extended multimedia file structure of claim 1, wherein the pointer that indicates the external multimedia file contains a URL of the location of the external multimedia file.

4. The non-transitory computer readable medium having stored thereon the extended multimedia file structure of claim 1, wherein at least one media block contains a media resource.

5. The non-transitory computer readable medium having stored thereon the extended multimedia file structure of claim 1, wherein the pointer that indicates the detail media block of the external multimedia file contains an indicator for the external multimedia file and an indicator for the detail media block within the external multimedia.

6. The non-transitory computer readable medium having stored thereon the extended multimedia file structure of claim 5, wherein the multimedia file structure is an MPEG-4 file structure, and the indicator for the detail media block is a track number which represents the detail media block within the sub multimedia file.

7. A computerized multimedia file producing method, comprising the steps of:
   reading a sub multimedia file to be used as an embedded media resource wherein the sub multimedia file is an MPEG-4 file;
   extracting and analyzing by a processor information of the sub multimedia file;
   producing metadata which contains a pointer which indicates a location of a detail media block contained in the sub multimedia file, wherein the pointer which indicates the detail media block contains at least one of an object descriptor ID (ODID) value and an elementary stream ID (ESID) value of the sub multimedia file; and
   collecting the metadata, a necessary general media block, and the multimedia file to produce a main multimedia file such that the main multimedia file comprises a metadata section that includes the pointer and a media data section that includes the sub multimedia file having the same format as the main multimedia file structure.

8. The computerized multimedia file producing method of claim 7, wherein the pointer which indicates the detail media block contains track information of the sub multimedia file.

9. A computerized multimedia file producing method, comprising the steps of:

selecting a reference multimedia file, wherein the reference multimedia file is an MPEG-4 file;

collecting location information of an external site where the reference multimedia file is stored, wherein the location information of the external site contains a URL of the external site;

accessing the external site to analyze the information of the reference multimedia file;

producing metadata by a processor which contains a pointer for indicating a location of the reference multimedia file and a pointer for indicating a location of a detail media block contained in the reference multimedia file; and collecting the metadata, a necessary general media block, and the location information of the reference multimedia file to produce a main multimedia file.

10. A computerized multimedia file executing method, comprising the steps of:

analyzing by a processor metadata of a multimedia file which contains a sub multimedia file therein, wherein the sub multimedia file is an MPEG-4 file; and reading at least one media block at a location indicated by a media pointer which forms the metadata, wherein when the media pointer indicates a detail media block of the sub multimedia file, the step of reading the media block comprises the step of reading the indicated detail media block, wherein the multimedia file comprises a metadata section including the media pointer indicating the detail media block and a media data section including the detail media block contained in the sub multimedia file having the same format as the multimedia file structure;

wherein the step of reading the detail media block comprises the steps of:

reading a media pointer, contained in the metadata, related to consumption of the sub multimedia file;

estimating whether the media pointer specifies the detail media block of the sub multimedia file or not;

reading location information of the detail media block specified by the media pointer; and consuming a media resource of the specified detail media block.

11. The computerized multimedia file executing method of claim 10, further comprising the step of consuming the sub multimedia file when the media pointer indicates the sub multimedia file itself.

12. The computerized multimedia file executing method of claim 10, wherein the location information of the detail media block contains a track ID of the sub multimedia file.

13. A computerized multimedia file executing method, comprising the steps of:

analyzing by a processor metadata of a multimedia file which refers to an external reference multimedia file wherein the multimedia file contains a pointer for indicating a location of the reference multimedia file and a pointer for indicating a location of a detail media block contained in the reference multimedia file, wherein the reference multimedia file is an MPEG-4 file;

checking whether at least one media pointer which forms the metadata indicates a file of an external site and downloading the external reference multimedia file of the indicated location; and consuming a media block at a location indicated by the media pointer;

wherein the step of consuming the media block comprises the step of consuming a detail media block of the reference multimedia file, and the step of consuming the detail multimedia block of the reference media file comprises the steps of:

reading a media pointer, contained in the metadata, related to the consumption of the reference multimedia file;

estimating whether the media pointer specifies the detail media block of the reference multimedia file or not;

reading location information of the detail media block of the reference multimedia file specified by the media pointer; and consuming a media resource of the specified detail media block.

14. The computerized multimedia file executing method of claim 13, wherein the step of analyzing the metadata comprises the step of obtaining location information of the external site, and the step of downloading the reference multimedia file comprises the steps of accessing the external site using the location information and downloading the reference multimedia file.

15. The computerized multimedia file executing method of claim 13, further comprising the step of consuming the reference multimedia file when the media pointer indicates the reference multimedia file itself.

16. The computerized multimedia file executing method of claim 13, wherein the location information of the detail media block contains a track ID of the reference multimedia file.

* * * * *